United States Patent Office 3,553,203
Patented Jan. 5, 1971

3,553,203
3-SUBSTITUTED PICOLINYL PENICILLINS AND CEPHALOSPORINS
J. S. Paul Schwarz, State College, Pa., and John T. Sheehan, Middlesex, N.J., assignors to E. R. Squibb & Sons, Inc., New York, N.Y., a corporation of Delaware
No Drawing. Continuation-in-part of applications Ser. No. 656,002 and Ser. No. 656,026, both filed July 26, 1967. This application June 17, 1969, Ser. No. 834,157
Int. Cl. C07d 99/16, 99/24
U.S. Cl. 260—239.1                                                      14 Claims

ABSTRACT OF THE DISCLOSURE

This invention relates to novel therapeutic agents related to penicillin and cephalosporin C. The compounds of the present invention contain the penicillin and cephalosporin C chemical structure substituted at the 6- or 7-position, respectively, with 3-substituted picolinic acid residues.

These compounds possess a high degree of activity against a large number of microorganisms, particularly penicillinase-producing microorganisms. In addition, the compounds of this invention are useful as animal feed supplements and as the active ingredient in germicidal preparations employed as surface disinfectants.

RELATED APPLICATIONS

This application is a continuation-in-part of copending U.S. patent application, Serial No. 656,002, filed July 26, 1967, and of copending U.S. patent application, Serial No. 656,026, filed July 26, 1967 both now abandoned.

This invention relates to novel therapeutic agents related to penicillin and cephalosporin C and which have activity as antimicrobial agents.

The compounds of the present invention may be represented by the following formula:

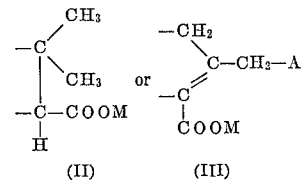

(I)

In the compounds of the present invention, as represented by the foregoing formula, the 3-substituent R may be one of the following groups:

Halogen, $XR^2$, wherein X is O or S,

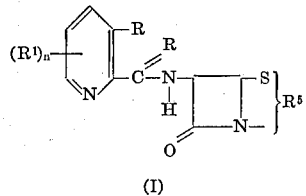

The halogen may be F, Cl, Br or I, and is preferably Cl or Br.

$R^2$ may be H, an acyl group derived from hydrocarbon carboxylic acids of up to 12 carbon atoms, a lower alkyl phenyl group, a phenyl lower alkyl group, or a phenyl group. The hydrocarbon carboxylic acids are exemplified by the lower alkonoic acids (e.g., acetic, propionic, butyric, pentanoic, octanoic, decanoic and hendecanoic acids), the corresponding lower alkenoic acids, the monocyclic aryl carboxylic acids (e.g., benzoic and toluic acids), the monocyclic aryl lower alkanoic acids (e.g., phenylacetic and β-phenylpropionic acid), and the cycloalkane and cycloalkene carboxylic acids.

$R^3$ and $R^4$ may each be selected from hydrogen, lower alkyl, cycloalkyl having from 4 to 7 carbon atoms, phenyl, phenyl lower alkyl, or lower alkyl phenyl, one of $R^3$ or $R^4$ being other than aryl or when taken together may constitute a heterocyclic ring having up to 6 carbon atoms.

Y is an acyl group derived from hydrocarbon carboxylic acids of up to 12 carbon atoms or a sulfonyl group derived from an alkyl or aryl sulfonic acid of up to 12 carbon atoms.

Z may be hydrogen or nitro.

R' may be hydrogen, lower alkyl, cycloalkyl having from 4 to 7 carbon atoms, lower alkoxy, phenyl, lower alkyl phenyl, lower alkoxyphenyl or halophenyl, and $n$ is an integer from 1 to 3.

$R^5$ may be either:

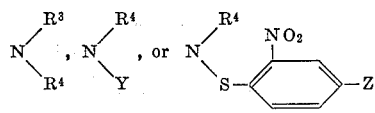

In the compounds of Formulae II and III, M may be H or a pharmaceutically acceptable non-toxic cation. As examples of pharmaceutically acceptable cations, there may be mentioned such metallic cations as sodium, potassium, calcium, and aluminum, and such non-metallic cations as trialkylamines, e.g., triethylamine, procaine, dibenzylamine, N-benzyl-β-phenethylamine, 1-ephenamine, N,N'-dibenzylethylenediamine, dehydroabietylamine, N, N'-bis-dehydroabietylethylenediamine, N - (lower)alkyl-piperidines, e.g., N-ethylpiperidine, quaternary ammonium ions (e.g., tetramethylammonium, tetraethylammonium, pyridinium, and the like), and other amines which have been used to form salts with benzylpenicillin. In Formula III, A is hydrogen, an acyloxy radical derived from a hydrocarbon carboxylic acid of up to 12 carbon atoms as defined above, a quaternary ammonium radical, e.g., tetramethylammonium, pyridinium, quinolium, picolinium, and so forth, amino, lower alkyl amino, such as ethylamino or isopropylamino, di(lower alkyl)amino, phenyl-lower alkylamino, di(phenyl-lower alkyl)amino, heterocyclic tertiary amino, such as, imidazolyl or piperidino, lower alkylmercapto, phenyl mercapto, phenyl lower alkylmercapto, thiouronium, lower alkyl-substituted thiouronium, phenyl substituted thiouronium and phenyl lower alkyl-substituted thiouronium, or a monovalent carbon-oxygen bond when taken together with M, or an anionic charge when A is a quaternary ammonium radical.

Compounds of this invention (i.e., the compounds of Formula I) are physiologically active substances which have a high degree of antibacterial activity against a large number of microorganisms, including gram positive and gram negative micro organisms such as *Staphylococcus aureus*, *Streptococcus pyogenes*, *Escherichia coli*, *Klebsiella pneumoniae*, *Aerobacter aerogenes*, and *Shigella sommei*. Further, the compounds of this invention have antibacterial activity against normally antibiotic-resistant strains of microorganisms, that is, those microorganisms which produce pencillinase, such as certain strains of *Staphylococcus aureus*.

For these purposes, they may be administered orally or parenterally in such form as tablets, capsules, injectables, or the like by incorporating the appropriate dosage of the compound with carriers according to standard pharmaceutical practices. Dosages for various mammalian species (e.g., rates, dogs, cats, cattle, horses, etc.) would be from about 0.01 to about 1.5 gm./kg. daily, administered once to several times a day In addition, the compounds of this invention are useful as animal feed supplements as an aid in increasing growth rate, improved feed efficiency, and in the suppression of infections during periods of stress, such as weaning, castration, vaccination, high temperature and moving. For such purposes, the concentration in the animal feed would range from about 10 to 400 grams per ton, optimally about 200 grams per ton.

Further, the compounds of this invention may be employed as surface disinfectants against various staphylococci. For this purpose, they are dissolved or suspended in water, preferably also containing a detergent, at a concentration of about 0.5% and about 10%, and may be used as washes to disinfect walls, floors and the like.

(1) Compounds in accordance with Formula I wherein R is —OR² are prepared by the following reaction schema wherein R¹, R² and n are as set forth above:

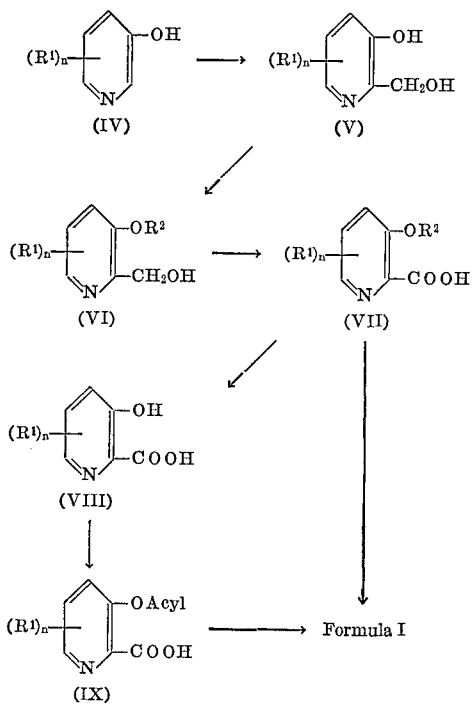

In the first step of this process, 3-hydroxypyridines in accordance with Formula IV are reacted with formaldehyde in the presence of an aqueous solution of a base such as sodium hydroxide to form the 2-hydroxymethyl derivative (Compounds V).

An aqueous solution of Compounds V with potassium hydroxide and potassium iodide is then reacted with a compound having the formula R²Cl, such as benzylchloride, to form the ether derivatives (Compounds VI).

Compounds VI are then oxidized to the acid (Compounds VII) in the presence of an oxidizing agent such as potassium permanganate, manganese dioxide, chromic acid, and the like.

The compounds in accordance with Formula VII may then be coupled with the desired 6-aminopenicillanic acid or 7-aminocephalosporanic acid to produce corresponding 6- or 7-substituted products in accordance with Formula I.

(2) Compounds in accordance with Formula I wherein R is

and R³ and R⁴ are each one of lower alkyl, cycloalkyl, phenyl, halo-substituted phenyl, lower alkyl phenyl, or phenyl lower alkyl, only one of R³ or R⁴ being phenyl, may be prepared by the following reaction schema wherein R¹ and n are as set forth above:

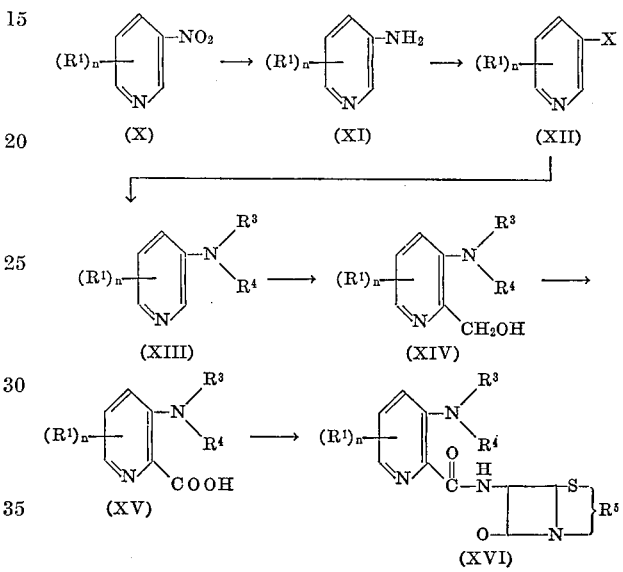

In the first step of the above reaction schema, 3-nitropyridines (Compounds) may be reduced by the action of such reducing agents as stannous chloride in hydrochloric acid, activated aluminum in aqueous ether, Raney nickel, and the like, to form 3-aminopyridines (Compounds XI).

The aminopyridines may then be converted to 3-halopyridines (Compounds XII) by diazotization of the amine by the action of an acid and either an alkaline metal nitrite or alkyl nitrite followed by replacement of the diazonium groups with halogen using an alkali metal bromide or chloride in conjunction with copper powder or cuprous bromide or chloride. The bromine or chlorine at the 3-position of Compounds XII may then be repaced by a dialkyl, akylcycloalkyl, aralkylcycloalkyl, arylcycloalkyl, alkylaralkyl, diaralkyl, aralkylaryl or alkylarylamine by reaction with the appropriate amine under elevated temperatures in the presence of a copper sulfate catalyst to provide compounds in accordance with Formula XIII, which are then converted to the 2-hydroxymethyl derivatives (Compounds XIV) by reaction with formaldehyde in the presence or absence of solvents such as water soluble ethers or alcohols. The 2-hydroxymethyl group may then be easily oxidized with such oxidizing agents as manganese dioxide, potassium permanganate, chromic acid, and the like, to the 2-carboxy group, thus forming Compounds XV.

Aminopicolinyl-substituted compounds in accordance with Formula I wherein only one of R³ and R⁴ is benzyl, the other being a substituent other than hydrogen, are likewise easily prepared by reacting the 3-halopyridine with the appropriate (R) (benzyl) amine wherein R is lower alkyl, cycloalkyl, phenyl, phenyl lower alkyl or lower alkyl phenyl. For instance, reaction at the 3-haloamine with methylbenzylamine results in compounds according to Formula XVI wherein R is methyl. Catalytic hydrogenolysis of this product yields a compound of Formula I wherein R is

The coupling of acids in accordance with Formulae VII and XV as well as the other picolinic acids herein described, may be accomplished by reacting the desired picolinic acid with amino compounds having the formula

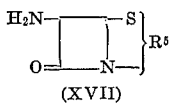

(XVII)

by procedures well known in the art, employing known coupling agents such as dicyclohexylcarbodiimide, bis-(imidazolyl)-carbonyl or ethoxy acetylene, or mixed anhydrides. The applications of these methods in amide synthesis have been reviewed by M. Bodanszky and M. Ondetti, "Peptide Synthesis," Interscience, New York, 1966.

(3) Compounds in accordance with Formula I wherein R is

and $R^3$ and $R^4$ are hydrogen may be prepared as shown above under (2) by coupling Compound XV with 6-aminopenicillanic acid or 7 - aminocephalosporanic acid by methods known in the art as set forth above to form the corresponding penicillin or cephalosporin derivatives which are the final products of this invention.

(4) Alternatively, the picolinic acids can be converted to their corresponding activated forms having the formula

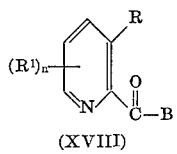

(XVIII)

wherein R, $R^1$ and $n$ are as set forth hereinabove, and B represents halogen, azide or p-nitrophenoxy, employing the appropriate reagents in known fashion (Bodanszky and Ondetti, op. cit.). Compounds obtained according to Formula XVIII are then reacted with the amino compound of Formula XVII in the presence of a base such as pyridine, triethylamine or sodium bicarbonate to provide compounds of this invention in accordance with Formula I.

Among the suitable starting materials in accordance with Formula X may be mentioned 3-nitropyridine, 4-methyl-3-nitropyridine, 5 - methyl - 3-nitropyridine, 6-methyl-3-nitropyridine, 6-ethyl-3-nitropyridine, 3-nitro-6-propylpyridine, 6-butyl - 3 - nitropyridine, 6-isobutyl-3-nitropyridine, 3 - nitro-6-pentylpyridine, 4-benzyl-3-nitropyridine and 3-nitro-6-phenethylpyridine.

(5) Compounds in accordance with Formula VII wherein R is benzyl may be converted to 3-hydroxypicolinic acids (Compounds VIII) by hydrogenolysis in the presence of a platinum or palladium catalyst, either alone, or on a support such as carbon, barium sulfate, or calcium carbonate. Compounds VIII may then be converted to 3-acyloxypicolinic acid derivatives (Compounds IX) by simple reaction with anhydrides of lower alkanoic acids such as acetic anhydride. The 3-acyloxy derivatives may then be coupled with 6-aminopenicillanic acid or 7-aminocephalosporanic acid as set forth above to provide the final products of this invention.

3-hydroxypicolinyl penicillins and cephalosporins are prepared from 3-benzyloxypicolinic acids (Compounds VII wherein $R^2$ is benzyl) by the following reaction schema, wherein $R^1$, $R^3$, $n$ and Bz are as set forth above:

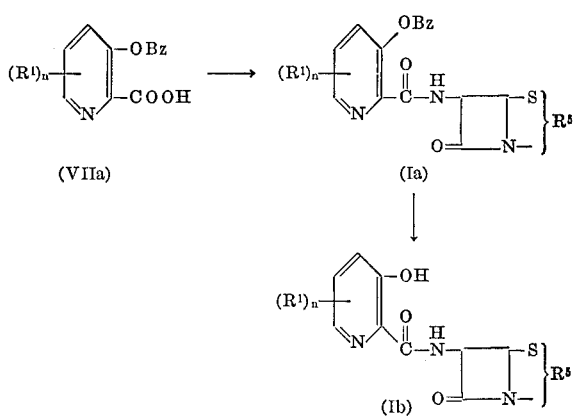

In the first step of the above reaction schema, compounds in accordance with Formula VIIa are coupled with 6-aminopenicillanic acid or 7-aminocephalosporanic acid as set forth above to produce the corresponding 6- or 7-(3-benzyloxypicolinamido) penicillin or cephalosporanic derivatives (Compounds I$a$), which are final products of this invention. These derivatives may then be hydrogenated, as in the case of the production of compounds in accordance with Formula VIII, to produce the corresponding 6- or 7-(3-hydroxypicolinamido) derivatives (Compounds I$b$) which are also final products of this invention.

Among the suitable starting materials in accordance with Formula IV may be mentioned 3-pyridinol, 4-methyl-3-pyridinol, 6-propyl-3-pyridinol, 6-isopropyl-3-pyridinol, 6-isobutyl-3-pyridinol, 6 - pentyl-3-pyridinol, 6-benzyl-3-pyridinol, 6 - phenethyl-3-pyridinol, 5-ethoxy-3-pyridinol and 6-methoxy-3-pyridinol.

(6) Compounds in accordance with Formula I wherein R is $SR^2$ or halogen are prepared by the following reaction schema wherein $R^1$, $R^2$ and $n$ are as set forth above, X is halogen and Bz is benzyl:

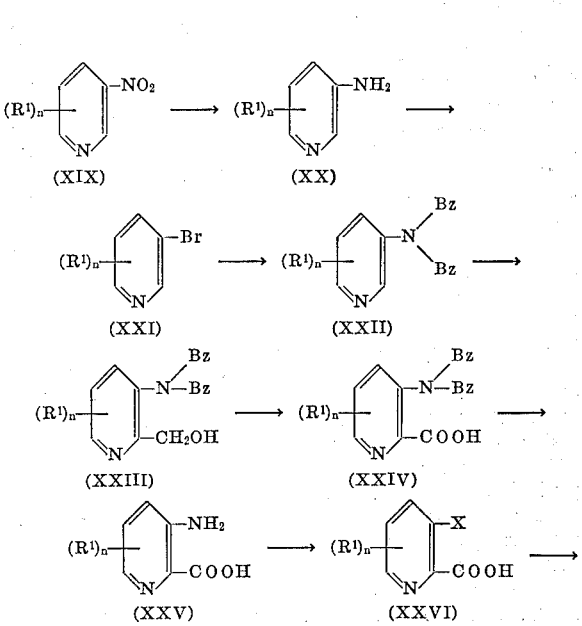

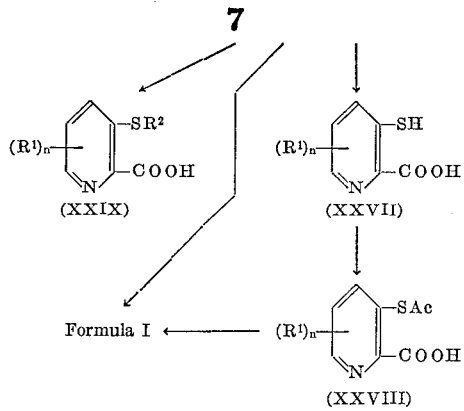

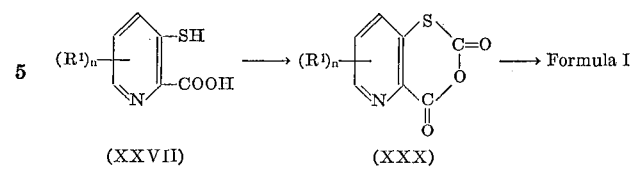

In the first step of this reaction schema, 3-nitro-pyridines (Compounds XIX) may be reduced by the action of such reducing agents as stannous chloride in hydrochloric acid, activated aluminum in aqueous ether, Raney nickel, and the like, to form 3-aminopyridines (Compounds XX).

The aminopyridines may then be converted to 3-bromopyridines (Compounds XXI) by diazotization of the amine by the action of an acid and either an alkali metal nitrite or alkyl nitrite followed by replacement of the diazonium groups with bromine using an alkali metal bromide in conjunction with copper powder or cuprous bromide.

The 3-bromopyridines may then be converted to 3-dibenzylaminopyridines (Compounds XXII) by simple substitution of the bromine atom employing copper sulfate as a catalyst. Compounds XXII are then converted to the 2-hydroxymethyl derivatives (Compounds XXIII) by reaction with formaldehyde in the presence or absence of solvents such as water soluble ethers or alcohols. The 2-hydroxymethyl group may then be easily oxidized with such oxidizing agents as manganese dioxide, potassium permanganate, chromic acid, and the like to the 2-carboxy group, thus forming Compounds XXIV.

Compounds XXIV may then be hydrogenated to the 3-aminopicolinic acids (Compounds XXV) by catalytic hydrogenolysis as described above in the preparation of Compounds VIII.

The 3-aminopicolinic acids may then be converted to the corresponding 3-halo picolinic acids (Compounds XXVI) by diazotization as described above for Compounds XX.

The 3-halopicolinic acids in accordance with Formula XXVI may be converted to the corresponding 3-mercapto picolinic acids (Compounds XXVII) by treatment with an alkali metal hydrosulfide. These compounds may then be converted to the corresponding S-acyl derivatives (Compounds XXVIII) by treatment with either the anhydrides of volatile aliphatic acids or acid chlorides of less reactive acids (e.g., benzoic acid, decanoic acid, phenylacetic acid, and the like), each type of reaction being run under basic conditions in aqueous solution.

Alternatively, 3-halopicolinic acids, by treatment with an alkali metal salt of a mercaptan may be converted to the 3-R²-mercapto derivatives (Compounds XXIX).

Compounds in accordance with Formulae XXVI, XXVII, and XXIX may then be coupled with 6-aminopenicillanic acid or 7-aminocephalosporanic acid by methods known in the art as set forth above to form the corresponding penicillin or cephalosporin derivatives which are final products of this invention.

3-mercaptopicolinyl penicillins and cephalosporins in accordance with Formula I are prepared from the 3-mercaptopicolinic acids (Compounds XXVII) by the following reaction schema wherein $R^1$ and $n$ are as set forth above:

In accordance with the first step of this reaction schema, the cyclic anhydride (Compounds XXX) is formed by reaction of the 3-mercaptopicolinic acids (Compounds XXVII) by treatment with phosgene under elevated temperatures. The cyclic anhydride thus formed is then reacted with either 6-aminopenicillanic acid or 7-aminocephalosporanic acid under mildly acid conditions to produce the 6- or 7-(3-mercaptopicolinamido) penicillin or cephalosporin derivatives which are final products of this invention.

Among the suitable starting materials in accordance with Formula XIX may be mentioned 3-nitropyridine, 4-methyl-3-nitropyridine, 5-methyl-3-nitropyridine, 6-methyl-3-nitropyridine, 6-ethyl-3-nitropyridine, 3-nitro-6-propylpyridine, 6-butyl-3-nitropyridine, 6-isobutyl-3-nitropyridine, 3-nitro-6-pentylpyridine, 4-benzyl-3-nitropyridine and 3-nitro-6-phenethylpyridine.

(7) Those compounds in accordance with Formula I wherein $R^5$ is represented by Formula III and A is other than acetoxy are generally prepared from the acetoxy derivative by nucleophilic displacement of the acetoxy group by the appropriate group. For example, a compound in accordance with Formula I wherein $R^5$ is III and A is acetoxy may be reacted with, for instance, pyridine, under aqueous conditions at 35 to 45° C. at a pH of about 5 to 8. Alternatively, of course, compounds in accordance with Formula XVII may be converted to the desired derivatives in the above manner and then subjected to the described coupling reaction to form final products of this invention.

Derivatives in accordance with Formula I wherein A and M are taken together forming a monovalent carbonoxygen bond may be prepared by acid hydrolysis of compounds according to either Formula I or X, wherein A is acetoxy, to form a 7-substituted desacetylcephalosporanic acid lactone.

Alternatively, enzymatic hydrolysis of compounds of Formula I or X, wherein A is acetoxy may provide 7-substituted deacetyl cephalosporanic acid, wherein A is hydroxy, and these hydroxy compounds may be caused to form the lactones by acid treatment.

(8) In order to provide compounds of Formula I wherein R represents a primary or secondary amine, aminopicolinyl-substituted compounds in accordance with Formula I wherein one or both, respectively, of $R^3$ and $R^4$ are benzyl are first prepared, and the benzyl group or groups are removed by means of catalytic hydrogenolysis to produce the corresponding primary or secondary amines.

(9) Aminopicolinyl-substituted compounds in accordance with Formula I wherein both $R^3$ and $R^4$ are benzyl are easily prepared by the simple expedient of reacting a 3-halopyridine (Compound XII) with a dibenzylamine and proceeding in accordance with the above reaction schema to obtain a dibenzylamino-substituted product in accordance with Formula XVI. Catalytic hydrogenolysis of this product results in compounds of Formula I wherein R is —$NH_2$.

(10) Compounds in accordance with Formula I wherein R is

and $R^3$ is hydrogen and $R^4$ is benzyl may be prepared by the following reaction schema, $R^1$, X and $n$ being as recited above and $B_z$ representing benzyl:

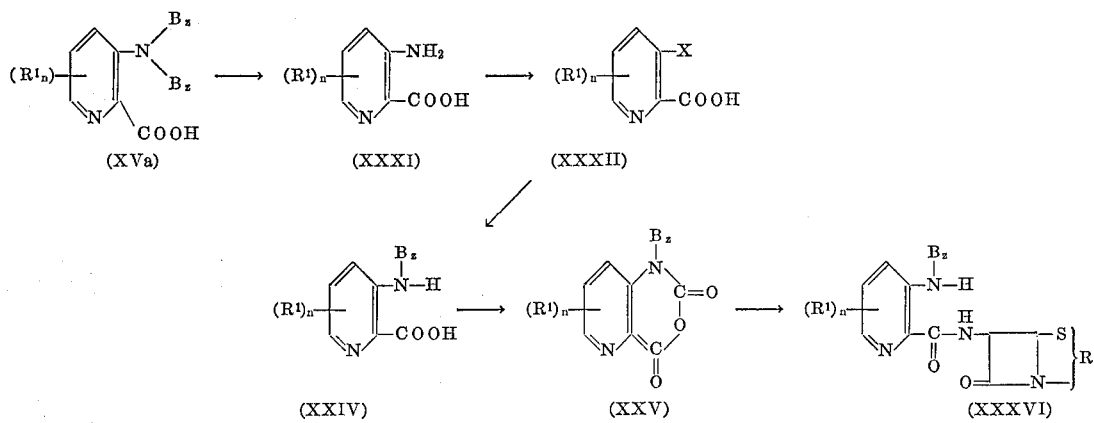

In the first step of this reaction schema, Compounds XVa may be hydrogenated to the 3-aminopicolinic acids (Compounds XXXI) by catalytic hydrogenolysis as described above.

The 3-aminopicolinic acids may then be converted to the corresponding 3-halopicolinic acids (Compounds XXXII) by diazotization as described above for Compounds XI.

The 3-halopicolinic acids in accordance with Formula XXXII may be converted to the corresponding 3-benzylaminopicolinic acid (Compounds XXIV) by reaction with benzylamine at elevated temperatures in the presence of a catalyst such as copper sulfate.

Compounds XXIV are then converted to the cyclic anhydride (Compounds XXV) by reaction with phosgene under elevated temperatures. The anhydride thus formed is then reacted with either 6-aminopenicillanic acid or 7-aminocephalosporanic acid or derivatives thereof to produce products in accordance with Formula XXXVI.

As stated above, the penicillins or cephalosporins so produced possessing one or two benzyl groups on the nitrogen are catalytically hydrogenated to form the desired prmiary or secondary amino-picolinyl-substituted derivatives. The hydrogenolysis may be conducted in the presence of a platinum or palladium catalyst, either alone or on a support such as carbon, barium sulfate or calcium carbonate.

(11) Alternatively, compounds of Formula I wherein R is

and $R^3$ is hydrogen and $R^4$ is benzyl may be prepared by the following reaction schema wherein $R^1$, $n$ and Bz are as set forth above:

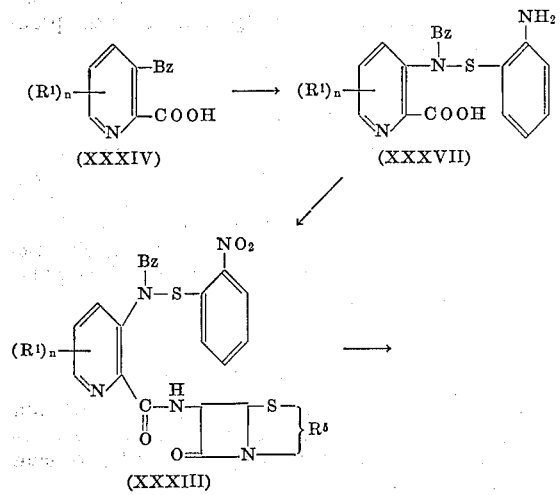

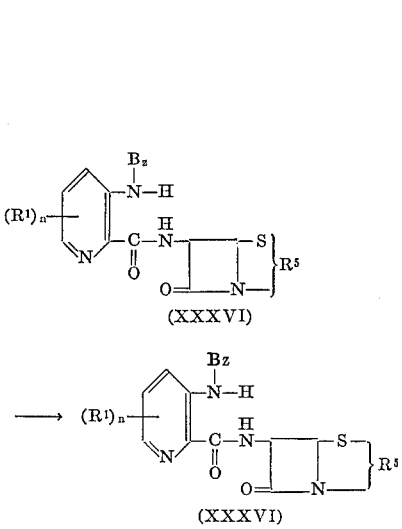

In the first step of this reaction schema, a benzylaminopicolinic acid (Compounds XXXVIV) is treated with o-nitrophenylsulfenyl chloride in a solvent such as aqueous dioxane at a neutral or basic pH (i.e., a pH between 7 and 11) to form an o-nitrophenylsulfenyl-protected aminopicolinic acid (Compounds XXXVII).

The protected acid is then coupled to an amine of Formula XVII by procedures known in the art as set forth above to produce a protected penicillin or cephalosporin derivative XXXVIII.

The protecting group is then removed from Compound XXXVIII by treating it, in a solution of aqueous dioxane, with for example, aqueous potassium iodide at a pH of between about 1 to 7 to produce the desired benzylamino-substituted penicillin or cephalosporin in accordance with Formula XXXVI.

It should be understood that the above two reaction schemas may likewise be employed to directly produce other secondary amines in accordance with Formula I by employing as starting materials aminopicolinic acids having the desired substituent attached to the amino nitrogen.

(12) In the same manner, by employing other primary aminopicolinic acids in the latter sequence, it is possible to obtain the various primary amino-substituted penicillins and cephalosporins directly, without the necessity of first preparing the benzylamino derivatives.

(13) N-acyl and N-sulfonyl derivatives of the amino and monosubstituted-amino picolinic acids may be prepared and coupled to produce additional new cephalosporins and penicillins.

Accordingly, N-acyl derivatives of amino and monosubstituted-amino picolinic acids may be prepared, in the case of the lower aliphatic acids, by reaction with an anhydride (e.g., acetic anhydride, propionic anhydride, butyric anhydride, and the like) in a solvent such as pyridine.

Other acyl derivatives as well as the sulfonyl derivatives may be prepared through reaction of these compounds with the acid chlorides (e.g., benzoyl chloride, benzenesulfonyl chloride, methanesulfonyl chloride, and the like) under Schotten-Baumen conditions. Acylation by means of the Schotten-Bauman reaction is well known in the art. See, for instance, the Merck Index, 7th Edition (1960), page 1467.

(14) Those compounds in accordance with Formula I wherein $R^5$ is represented by Formula III and A is other than acetoxy are generally prepared from the acetoxy derivative by nucleophilic displacement of the acetoxy group by the appropriate group. For example, a compound in accordance with Formula I wherein $R^5$ is III and A is acetoxy may be reacted with, for instance, pyridine, under aqueous conditions at 35 to 45° C. at a pH of about 5 to 8. Alternatively, of course, compounds in accordance with Formula XVII may be converted to the desired derivatives in the above manner and then subjected to the described coupling reaction to form final products of this invention.

(15) Derivatives in accordance with Formula I wherein A and M are taken together forming a monovalent carbon-oxygen bond may be prepared by acid hydrolysis of compounds according to either Formula I or X, wherein A is acetoxy, to form a 7-substituted desacetylcephalosporanic acid lactone.

(16) Alternatively, enzymatic hydrolysis of compounds of Formula I or XXVII, wherein A is acetoxy may provide 7-substituted deacetyl cephalosporanic acid, wherein A is hydroxy, and these hydroxy compounds may be caused to form the lactones by acid treatment.

As indicated, these reactions may be performed either before or after the coupling reaction in forming products in accordance with this invention.

The following examples illustrate the invention. All temperatures are in degrees centigrade unless otherwise stated:

EXAMPLE 1

2-hydroxymethyl-6-methyl-3-pyridinol hydrochloride

To a solution of 6-methyl-3-pyridinol (10.9 g., 0.1 mole) and sodium hydroxide (4 g., 0.1 mole) in water (40 ml.), 38% formaldehyde solution (8 ml., 0.1 mole) is added. The mixture is heated for three hours at 90°, then cooled to room temperature, and acetic acid (6 g., 0.1 mole) is added. The solvent is removed under vaccum, and the product is extracted from the sodium acetate with warm acetone (three 100 ml. portions). The combined extracts are treated with hydrogen chloride gas at 0° until precipitation is complete. The precipitate is filtered and washed with acetone (50 ml.). The product may further be purified by crystallization from ethanolic or aqueous hydrochloric acid.

EXAMPLE 2

5-methyl-2-hydroxymethyl-3-pyridinol hydrochloride

The procedure in Example 1 is repeated using instead as starting material 5-methyl-3-pyridinol (10.9 g., 0.1 mole).

EXAMPLE 3

6-benzyl-2-hydroxymethyl-3-pyridinol hydrochloride

The procedure in Example 1 is repeated using instead as starting material 6-benzyl-3-pyridinol (17.1 g., 0.1 mole).

EXAMPLE 4

2-hydroxymethyl-6-methoxy-3-pyridinol hydrochloride

The procedure in Example 1 is repeated using instead as starting material 6-methoxy-3-pyridinol (12.5 g., 0.1 mole).

EXAMPLE 5

2-hydroxymethyl-4-methyl-5-phenyl-3-pyridinol hydrochloride

The procedure in Example 1 is repeated using instead as starting material 4-methyl-5-phenyl-3-pyridinol (18.5 g., 0.1 mole).

EXAMPLE 6

2-hydroxymethyl-6-phenethyl-3-pyridinol hydrochloride

The procedure in Example 1 is repeated using instead as starting material 6-phenethyl-3-pyridinol (19.9 g., 0.1 mole).

EXAMPLE 7

5-cyclohexyl-2-hydroxymethyl-4-methyl-3-pyridinol hydrochloride

The procedure in Example 1 is repeated using instead as starting material 5-cyclohexyl-4-methyl-3-pyridinol (19.1 g., 0.1 mole).

EXAMPLE 8

2-hydroxymethyl-4-methoxy-6-methyl-3-pyridinol hydrochloride

The procedure in Example 1 is repeated using instead as starting material 4-methoxy-6-methyl-3-pyridinol (13.9 g., 0.1 mole).

EXAMPLE 9

5-ethoxy-2-hydroxymethyl-3-pyridinol hydrochloride

The procedure in Example 1 is repeated using instead as starting material 5-ethoxy-3-pyridinol (13.9 g., 0.1 mole).

EXAMPLE 10

3-benzyloxy-2-hydroxymethyl-6-methylpyidine

To a solution of 27.8 g. (0.2 mole) of 2-hydroxymethyl-6-methyl-3-pyridinol hydrochloride in 100 ml. of water, a solution of 26 g. of potassium hydroxide in 100 ml. of water containing 0.5 g. potassium iodide is added. The temperature is kept below 30° C. by external cooling and by controlling the rate of addition. To this solution, 300 ml. of methanol and 32 ml. of benzyl chloride are added, and the entire mixture is stirred at room temperature in a closed vessel for 72 hours. After this period, the insoluble salt formed is filtered off and washed with methanol. The filtrate and washings are combined and concentrated in vacuo at a bath temperature of 30–35°. As all of the methanol is removed, the product separates and is filtered off.

EXAMPLE 11

3-benzyloxy-6-methylpicolinic acid hydrochloride

To a stirred suspension of 15.3 g. (0.067 mole) of 3-benzyloxy-2-hydroxymethyl-6-methylpyridine in 350 ml. of water, 7.7 g. (0.049 mole) of potassium permanganate is added, and the mixture is heated to about 80° for one hour. After this period, a second portion of 7.7 g. of potassium permanganate and 150 ml. of water is added, and the heating and stirring continued for two hours at 75–85°. The reaction mixture is allowed to cool slightly and the manganese dioxide removed by gravity filtration and then washed with about 200 ml. of hot water. The combined filtrate and washings are then extracted three times with 100 ml. portions of chloroform and these extracts discarded. The aqueous mother liquor is acidified with 200 ml. concentrated hydrochloric acid and concentrated under vacuum at room temperature until the product precipitates.

EXAMPLE 12

3-hydroxy-6-methylpicolinic acid

A solution of 4.86 g. (0.02 mole) of 3-benzyloxy-6-methylpicolinic acid hydrochloride in 200 ml. of 50% ethanol is hydrogenated at room temperature under atmospheric pressure in the presence of 9.5 g. of 5% palladium on charcoal until the hydrogen uptake has ceased. The catalyst is removed by filtration and the product isolated by concentration of the filtrate.

EXAMPLE 13

3-acetoxy-6-methylpicolinic acid 3-hydroxy-6-methylpicolinic acid (1 g.) is stirred with 10 ml. of pyridine and 10 ml. of acetic anhydride overnight. The solvents are then stripped off under vacuum to yield the product.

EXAMPLE 14

Sodium 6-(3-benzyloxy-2-picolinamido)penicillanate 3-benzyloxy-2-picolinic acid hydrochloride sesquihydrate (1.098 g., 3.74 mmoles) is dissolved in 25 ml. of chloroform containing triethylamine (0.755 g., 7.48 mmoles). Ethylchloroformate (0.406 g., 3.74 mmoles) is added to the ice-cooled solution of this acid. After 30 minutes, an ice-cooled solution of 6–APA (0.808 g., 3.74 mmoles) and triethylamine (0.755 g., 7.48 mmoles) in 50 ml. of chloroform is added to the previously described solution. The resulting mixture is allowed to warm slowly to room temperature as the ice melts. After 12 hours, the chloroform is removed under vacuum, and the residue is dissolved in 100 ml. of water. The solution is washed with 2× 75 ml. of ether, cooled in an ice-bath, layered with 75 ml. of MIBK, and acidified to pH 2.0. The layers are separated, and the aqueous layer is extracted with 2× 75 ml. of MIBK. The combined MIBK extracts are stirred with ice cooling with 100 ml. of water while the pH of the water is adjusted to 7.0 with 2 N NaOH. The aqueous layer is separated, washed with 50 ml. of ether, and lyophilized to yield the sodium salt of the penicillin.

EXAMPLE 15

Sodium 7-(3-benzyloxy-2-picolinamido)cephalosporanate

The procedure in Example 14 is followed except that a solution of 7–ACA (1.02 g., 3.74 mmoles) and triethylamine (1.51 g., 15.0 mmoles) in 75 ml. of chloroform is substituted for the 6–APA solution used in that example.

EXAMPLE 16

Sodium 6-(3-hydroxy-2-picolinamido)penicillanate

The product of Example 14 (163 mg.) dissolved in 7 ml. of water is stirred at room temperature in an atmosphere of hydrogen with 300 mg. of 5% Pd on $CaCO_3$ (prereduced) until the hydrogen consumed indicates that the benzyl group has been removed. The catalyst is then filtered, and the filtrate is lyophilized to yield the product.

EXAMPLE 17

Sodium 7-(3 - hydroxy-2-picolinamido)cephalosporanate

The procedure of Example 16 is followed except that 200 mg. of the product of Example 15 is substituted for the starting material in that example, hydrogenation is stopped after one equivalent is absorbed.

EXAMPLE 18

3-amino-6-butylpyridine 6-butyl-3- nitropyridine (20 g.) is dissolved in concentrated hydrochloric acid (100 ml.) and treated with stannous chloride (85 g.). After the original exothermic reaction has subsided, the reaction mixture is heated on a steam bath for one hour. The cooled reaction mixture is then treated with concentrated aqueous sodium hydroxide until the resulting stannic hydroxide has redissolved. The solution is extracted with ether, and the ether is dried with sodium hydroxide pellets and evaporated to yield the product.

EXAMPLE 19

3-bromo-6-butylpyridine 3-amino-6-butylpyridine (22 g.) is dissolved in a mixture of concentrated sulfuric acid (65 g.) and water (130 ml.) and cooled in an ice bath. Sodium nitrite (12 g.) in water (35 ml.) is added, followed, after ten minutes, by potassium bromide (60 g.) and copper powder (20 g.). After 45 minutes, the reaction mixture is made strongly alkaline under cooling, and the resulting mixture is steam distilled. The distillate is extracted with ether, and the ether is dried with anhydrous sodium sulfate and evaporated to yield the product.

EXAMPLE 20

6-butyl-3-dibenzylaminopyridine 3-bromo-6-butylpyridine (13 g.), dibenzylamine (25 g.), and copper sulfate (1 g.) are heated in a bomb for 20 hours at 140°. After the reaction is completed, the contents are washed out with water (100 ml.) and the resulting solution is made basic and extracted with ether. The ether is dried with anhydrous sodium sulfate and evaporated to yield the product.

EXAMPLE 21

2-hydroxymethyl-6-butyl-3-dibenzylaminopyridine

To a mixture of 6-butyl-3-dibenzylaminopyridine (0.1 mole) in dioxane (100 ml.), 38% formaldehyde solution (8 ml., 0.1 mole) is added. The mixture is heated for 10 hours at 90° under nitrogen, and then cooled to room temperature. The solvents are removed under vacuum to yield the product.

EXAMPLE 22

6-butyl-3-dibenzylaminopicolinic acid

To a stirred suspension of 2-hydroxymethyl-6-butyl-3-dibenzylaminopyridine (0.1 mole) in water (500 ml.), potassium permanganate (10.4 g., 0.2 equivalent, 50% of theoretical) is added, and the mixture is heated to about 80° for one hour. After this period, a second portion of potassium permanganate (10.4 g., 0.2 equivalent, 50% of theoretical) is added, and the heating and stirring continued for two hours at 80°. The reaction mixture is filtered by gravity to remove the manganese dioxide which is washed with about 200 ml. of boiling water. The combined filtrates are then extracted three times with 200 ml. portions of chloroform, and these extracts are discarded. The aqueous mother liquor is acidified with concentrated hydrochloric acid (200 ml.) and concentrated under vacuum at room temperature until a precipitate forms. A methanolic solution of the precipitate is then passed through a column of Amberlite IR–4B and the eluate is evaporated to obtain the product.

EXAMPLE 23

6-butyl-3-aminopicolinic acid 6-butyl-3-dibenzylaminopicolinic acid (200 mg.) dissolved in 10 ml. of ethyl alcohol is stirred at room temperature in an atmosphere of hydrogen with 500 mg. of 5% Pd on $CaCO_3$ (prereduced) until the hydrogen consumed indicates that the benzyl groups have been removed. The catalyst is then filtered, and the filtrate is taken to dryness to yield the product.

EXAMPLE 24

3-bromo-6-butylpicolinic acid 3-amino-6-butylpicolinic acid (19.4 g., 0.1 mole), concentrated hydrobromic acid (50 ml.), and water (150 ml.) is stirred together in an ice bath. Sodium nitrite (6.9 g., 0.1 mole) dissolved in a minimum of water is added. After 15 minutes, copper (20 g. is added) and the stirring continued for 45 minutes. The reaction mixture is then taken to dryness under vacuum. The residue is exhaustively extracted with absolute ethanol, and the ethanol is filtered and taken to dryness under vacuum at 100° to yield the product.

EXAMPLE 25

6-butyl-3-mercaptopicolinic acid hydrochloride 3-bromo-6-butylpicolinic acid (2.58 g., 10 mmoles) and copper powder (0.150 g.) is added to a hot solution of potassium hydrosulfide (1.44 g., 15 mmoles) in propylene glycol (5 ml.). The mixture is stirred under a reflux condenser under nitrogen at 175–190° for 20 hours. The mixture is then filtered to remove the solid, and the filtrate is taken to dryness under vacuum at about 100°. The residue is taken up in water (50 ml.) and acidified with concentrated hydrochloric acid (10 ml.). The mixture is taken to dryness under vacuum, and the residue extracted exhaustively with absolute ethanol. The filtered ethanol extracts are evaporated to yield the product. The hydrochloride is then converted to the free base by heating in vacuum at 100° C.

EXAMPLE 26

3 - benzylmercapto - 6 - butylpicolinic acid hydrochloride

The procedure in Example 25 is followed with the following changes:

(1) An appropriate amount of the potassium salt of mercaptan is substituted for the potassium hydrosulfide.

(2) Before the aqueous hydrochloric acid mixture is taken to dryness, it is extracted with ether to remove excess benzyl mercaptan.

EXAMPLE 27

3-acetylmercapto-6-butylpicolinic acid 6-butyl-3-mercaptopicolinic acid hydrochloride (1 g.) is dissolved in 25 ml. of water, and the pH is adjusted to 9 with sodium hydroxide. The solution is shaken with 3 ml. of acetic anhydride at 10° C. for 3 hours, keeping the pH between 8 and 9. The mixture is extracted with two 20-ml. portions of ether, and the aqueous is acidified to pH 3. The mixture is taken to dryness under a vacuum, and the residue is extracted exhaustively with absolute ethanol. The ethanol is evaporated to yield the product.

EXAMPLE 28

3-benzoylmercapto-6-butylpicolinic acid

The procedure in Example 36 is followed except that benzoyl chloride (0.666 g.) is used instead of the acetic anhydride and the reaction is terminated as soon as no further base additions are required to maintain the pH between 8 and 9.

EXAMPLE 29

Sodium 6-(3-mercaptopicolinamido)penicillanate 3-mercaptopicolinic acid (1.55 g., 10 mmoles) is suspended in dioxane (20 ml.) and treated with phosgene for 4 hours at 50°. The dioxane is removed under vacuum to yield the cyclic anhydride. 6-APA (2.16 g., 10 mmoles) is stirred with 200 ml. of water and the pH is adjusted to 5 with NaOH. The mixture is cooled to 0° in an ice-salt bath and the cyclic anhydride redissolved in a minimum of dioxane is added slowly over the course of one hour to the vigorously stirred 6-APA mixture while the pH is maintained at 5 with NaOH. After six hours the pH is taken to 7 with NaOH, and the solution is extracted with two 100 ml. portions of ether. The aqueous is freeze-dried to yield the product.

EXAMPLE 30

Sodium 6-(6-butyl-3-benzylmercaptopicolinamido) penicillinate 6-butyl-3-benzylmercaptopicolinic acid hydrochloride (3.38 g., 10 mmoles) is dissolved in ethanol-free chloroform (25 ml.) containing triethylamine (2.02 g., 20 mmoles). Pivalyl chloride (1.21 g., 10 mmoles) is then added to the ice-cooled solution of this acid. After 30 minutes, an ice-cooled solution of 6-APA (2.16 g., 10 mmoles) and triethylamine (2.02 g., 20 mmoles) in ethanol-free chloroform (100 ml.) is added to the previously described solution. The resulting mixture is allowed to warm slowly to room temperature as the ice melts. After 12 hours, the chloroform is removed under vacuum, and the residue is dissolved in water (100 ml.). A solution of N,N'-dibenzylethylenediamine diacetate (1.80 g., 5 mmoles, 10 mequiv.) in water (25 ml.) is added with stirring to this solution. The mixture is concentrated under vacuum at room temperature until precipitation of the product is complete. The product is isolated by filtration, and converted to the sodium salt by dissolving in a minimum volume of methanol and passing the resulting solution through a column of sulfonic-acid ion-exchange resin in the sodium salt form. The final product is isolated by evaporating the methanol under vacuum.

EXAMPLE 31

6-butyl-3-methylphenylaminopyridine 3-bromo-6-butylpyridine (13 g.), monomethylaniline (13.5 g.), and copper sulfate (1 g.) are heated in a bomb for 20 hours at 140°. After the reaction is completed, the contents are washed out with water (100 ml.) and the resulting solution is made basic and extracted with ether. The ether is dried with anhydrous sodium sulfate and evaporated to yield the product.

EXAMPLE 32

2-hydroxymethyl-6-butyl-3-methylphenylaminopyridine

To a mixture of 6-butyl-3-methylphenylaminopyridine (24 g., 0.1 mole) in dioxane (100 ml.), 38% formaldehyde solution (8 ml., 0.01 mole) is added. The mixture is heated for 10 hours at 90° under nitrogen, and then cooled to room temperature. The solvents are removed under vacuum to yield the product.

EXAMPLE 33

6-butyl-3-methylphenylaminopicolinic acid

To a stirred suspension of 2-hydroxymethyl-6-butyl-3-methylphenylaminopyridine (27.0 g., 0.1 mole) in water (500 ml.), potassium permanganate (10.4 g., 0.2 equivalent, 50% of theoretical) is added, and the mixture is heated to about 80° for one hour. After this period, a second portion of potassium permanganate (10.4 g., 0.2 equivalent, 50% of theoretical) is added, and the heating and stirring continued for two hours at 80°. The reaction mixture is filtered by gravity to remove the manganese dioxide which is washed with about 200 ml. of boiling water. The combined filtrates are then extracted three times with 200 ml. portions of chloroform, and these extracts are discarded. The aqueous mother liquor is acidified with concentrated hydrochloric acid (200 ml.) and concentrated under vacuum at room temperature until a precipitate forms.

The precipitate is dissolved in methanol and passed through a column of amberlite IR-4B. The eluate is evaporated to yield the product.

EXAMPLE 34

Sodium 6-(6-butyl-3-methylphenylaminopicolinamido) penicillanate 6-butyl-3-methylphenylaminopicolinic acid (2.72 g., 10 mmoles) is dissolved in ethanol-free chlorofrom (25 ml.) containing triethylamine (2.02 g., 20 mmoles). Pivalyl chloride (1.21 g., 10 mmoles) is then added to the ice-cooled solution of this acid. After 30 minutes, an ice-cooled solution of 6-APA (2.16 g., 10 mmoles) and triethylamine (2.02 g., 20 mmoles) in ethanol-free chloroform (100 ml.) is added to the previously described solution. The resulting mixture is allowed to warm slowly to room temperature as the ice melts. After 12 hours, the chloroform is removed under vacuum, and the residue is dissolved in water (100 ml.). A solution of N,N'-dibenzylethylenediamine diacetate (1.80 g., 10 mequiv.) in water (25 ml.) is added with stirring to this solution. The mixture is concentrated under vacuum at room temperature until precipitation of the product is complete. The product is isolated by filtration, and converted to the sodium salt by dissolving in a minimum volume of methanol and passing the resulting solution through a column of sulfonic acid ion-exchange resin in the sodium salt form. The final product is isolated by evaporating the methanol under vacuum.

EXAMPLE 35

Sodium 6-(3-benzylmethylaminopicolinamide) penicillanate

Following the procedure of Examples 18, 19 and 31–34 but substituting equivalent amounts of 3-nitropyridine for the 6-butyl-3-nitropyridine in Example 18, and benzylmethylamine for the monomethylaniline in Example 31, there is obtained respectively, 3-aminopyridine, 3-bromopyridine, 3-benzylmethylaminopyridine, 2-hydroxymethyl-3-benzylmethylaminopyridine, 3-benzylmethylaminopicolinic acid and finally sodium 6-(3-benzylmethylaminopicolinamido)penicillanate.

EXAMPLE 36

Sodium 6-(3-methylaminopicolinamido)penicillanate

Sodium 6-(3-benzylmethylaminopicolinamido)penicillanate (200 mg.) dissolved in 10 ml. of water is stirred at room temperature in an atmosphere of hydrogen with 500 ml. of 5% Pd on CaCO₃ (prereduced) until the hydrogen consumed indicates that the benzyl group has been removed. The catalyst is then filtered, and the filtrate is lyophilized to yield the product.

EXAMPLE 37

Sodium 7-(butyl-3-methylphenylaminopicolinamido) cephalosporanate

The procedure in Example 34 is followed except that a solution of 7–ACA (2.72 g., 10 mmoles) and triethylamine (4.04 g., 40 mmoles) in ethanol-free chloroform (225 ml.) is substituted for the 6-APA solution used in that example.

EXAMPLE 38

Sodium 7-(3-methylaminopicolinamido) cephalosporanate

The procedure in Example 36 is followed using instead as starting material sodium 7-(3-benzylmethylaminopicolinamido)cephalosporanate (200 mg.).

EXAMPLE 39

Sodium 6-(3-dibenzylaminopicolinamido)penicillanate

Following the procedure of Example 35 but substituting an equivalent amount of dibenzylamino for the benzylmethylamine, there is obtained in the same manner, 3-aminopyridine, 3-bromopyridine, 3-dibenzylaminopyridine, 2-hydroxymethyl-3-dibenzylaminopyridine, 3-dibenzylaminopicolinic acid and sodium 6-(3-dibenzylaminocipicolinamido)penicillanate.

EXAMPLE 40

Sodium 6-(3-aminopicolinamido)penicillanate

Following the procedure of Example 36, but substituing an equivalent amount of the final product of Example 39 for the sodium 6-(3-benzylmethylpicolinamido)penicillanate, the desired product is obtained.

EXAMPLE 41

3-aminopicolinic acid

Following the procedure of Example 36, but substituting an eqivalent amount of 3-dibenzylaminopicolinic acid (prepared as in Example 39) for the sodium 6-(3-benzylmethylpicolinamido)penicillanate and 80% aqueous ethanol for the water, there is obtained the desired product.

EXAMPLE 42

3-bromopicolinic acid 3-aminocipicolinic acid (0.1 mole), concentrated hydrobromic acid (50 ml.), and water (150 ml.) is stirred together in an ice bath. Sodium nitrite (0.1 mole) dissolved in a minimum of water is added. After 15 minutes, copper (20 g. is added) and the stirring continued for 45 minutes. The reaction mixture is then taken to dryness under vacuum. The residue is exhaustively extracted with absolute ethanol, and the ethanol is filtered and taken to dryness under vacuum to yield the product.

EXAMPLE 43

3-benzylaminopicolinic acid 3-bromopicolinic acid (10 g.), benzyl amine (10 g.) and copper sulfate (1.00 g.) are heated in a bomb for 20 hours at 140°. After the reaction is completed, the contents are washed out with 50% aqueous ethanol (200 ml.). The copper is removed by precipitation with hydrogen sulfide. After the copper sulfide is removed by fitration, an amount of Ba(OH)₂ solution equivalent to the amount of sulfate present is added, and the barium sulfate is removed by filtration. The filtrate is evaporated to yield the product.

EXAMPLE 44

Sodium 6-(3-benzzylaminopicolinamido)penicillianate 3-benzylaminopicolinic acid (10 mmoles) is suspended in dioxane (20 ml.) and treated with phosgene for four hours at 50°. The dioxane is removed under vacuum to yield the cyclic anhydride. 6–APA (10 mmoles) is stirred with 200 ml. of water and the pH is adjusted to 5 with NaOH. The mixture is cooled to 0° in an ice-salt bath and the cyclic anhydride redissolved in a minimum of dioxane is added slowly over the course of one hour to the vigorously stirred 6–APA mixture while the pH is maintained at 5 with NaOH. After six hours the pH is taken to 7 with NaOH, and the solution is extracted with two 100 ml. portions of ether. The aqueous solution is freeze-dried to yield the product.

EXAMPLE 45

(3-o-nitrophenylsulfenzylbenzylamino)picolinic acid 3-benzylaminopicolinic acid (2.28 g., 10 mmoles) is dissolved in 75% dioxane (200 ml.) with the aid of sodium hydroxide and the pH is adjusted to 11. o-Nitrophenylsulfenyl chloride (2.85 g., 15 mmoles) is added slowly with stirring over the course of 30 minutes while the pH is maintained between 10 and 11 by base additions. After the pH has become constant the reaction mixture is diluted to 400 ml. with water and filtered. The filtrate is extracted with ether until no additional color is removed. The aqueous is then layered with ether (250 ml.) cooled to 10° and acidified to pH 2. The aqueous is separated from the ether and extracted with additional ether until no more color is removed from the aqueous. The combined ether extracts are dried with anhydrous sodium sulfate and evaporated to yield the product.

EXAMPLE 46

Sodium 6-[3-(o-nitrophenylsulfenylbenzylamino) picolinamido]penicillanate

The procedure of Example 34 is followed using instead as starting material 3-(o-nitrophenylsulfenylbenzylamino) picolinic acid (3.81 g., 10 mmoles).

EXAMPLE 47

Sodium 6-(3-benzylaminopicolinamido)penicillanate

Sodium 6-[3-(o-nitrophenylsulfenylbenzylamino)picolinamido]penicillanate (6.00 g., 10 mmoles) is dissolved in 50% dioxane (150 ml.) and treated with potassium iodide (3.32 g., 10 mmoles). The pH is adjusted to 4 with hydrochloric acid to start the reaction. The iodine liberated is titrated with sodium thiosulfate and additional hydrochloric acid is added to maintain the pH. When the reaction is completed, the di(o-nitrophenyl)disulfide is removed by filtration. The filtrate is diluted to 300 ml. with water, and the pH is adjusted to 7. The aqueous is extracted with ether to complete the removal of the disulfide, and N,N′-dibenzylethylenediamine diacetate (1.80 g., 5 mmoles, 10 mequiv.) in water (25 ml.) is added. The mixture is concentrated to complete the precipitation,

EXAMPLE 48

3-acetylaminopicolinic acid 3-aminopicolinic acid (1 g.) is dissolved in a mixture of 15 ml. of pyridine and 15 ml. of acetic anhydride and the mixture is allowed to stand overnight. The excess acetic anhydride and the pyridine are then taken off under vacuum at 35° C. to yield the product.

EXAMPLE 49

3-benzoylaminopicolinic acid 3-aminopicolinic acid (10 mmoles) is dissolved in water (50 ml.) which has been adjusted to pH 8 with sodium hydroxide. The solution is cooled in an ice bath, and benzoyl chloride (10 mmoles) is added slowly with stirring while the pH is maintained at 8 by additions of additional sodium hydroxide. When the pH has ceased to change, the mixture is extracted with two 30-ml. portions of ether and then acidified to pH 2 with hydrochloric acid. The reaction mixture is evaporated to dryness, and the residue is extracted with absolute ethanol. The ethanol extract is filtered and evaporated, and the residue is dried at 100° under vacuum to yield the product.

EXAMPLE 50

3-benzenesulfonamidopicolinic acid

The procedure of Example 49 is followed except that instead of benzoyl chloride an appropriate amount of benzenesulfonyl chloride is used.

EXAMPLE 51

3-diethylaminopicolinic acid 3-bromopicolinic acid (5 g.), diethylamine (10 g.) and copper sulfate (0.5 g.) are heated in a bomb for 20 hours at 140° C. After this time, the bomb is cooled and the contents dissolved in water, adding hydrochloric acid if necessary. The copper is precipitated as the sulfide by hydrogen sulfide. The (filtered) solution is treated with ammonia to pH 7 and concentrated. The product is obtained as a solid from the concentrate.

EXAMPLE 52

3-phenylaminopicolinic acid

Substitution of aniline for diethylamine in the procedure of the previous example gives the desired product.

EXAMPLE 53

7-[3-diethylaminopicolinamido]cephalosporanic acid

A solution of 194 mg. (1.0 mmole) 3-diethylaminopicolinic acid and 152 mg. (0.142 ml., 1.0 mmole) triethylamine in 4.0 ml. of tetrahydrofuran are cooled to −10° C. and treated with 136 mg. (0.138 ml., 1.0 mmole) isobutyl chloroformate and stirred for 10 minutes.

A cold solution (<5° C.) of 7-aminocephalosporanic acid, 272 mg. (1.0 mmole) in 3.6 ml. of 1:1 water-tetrahydrofuran containing 101 mg. triethylamine was then added to the solution of the preformed mixed anhydride. The reaction mix is stirred for 45 minutes at −5 to −10° C. and then allowed to warm to room temperature over a 45-minute interval. The resulting suspension is filtered to remove the product; additional material may be obtained by concentration of the mother liquor.

EXAMPLE 54

7-[3-diethylaminopicolinamido]desacetoxy cephalosporanic acid

Substitution of 212 mg. (1.0 mmole) of desacetoxy 7-aminocephalosporanic acid for the 7-aminocephalosporanic acid in the previous example gives the desired product.

EXAMPLE 55

6-(3-diethylaminopicolinamido)penicillanic acid

Substitution of 214 mg. of 6-aminopenicillanic acid for the 7-aminocephalosporanic acid in Example 53 gives the desired product.

EXAMPLE 56

7-[3-(phenylamino)-picolinamido]cephalosporanic acid

Substitution of 1.0 mmole of 3-phenylamino picolinic acid in the procedure of Example 53 yields the desired product.

EXAMPLE 57

7-[3-(phenylamino)-picolinamido]desacetoxy cephalosporanic acid

Substitution of 1.0 mmole of 3-phenylamino picolinic acid in the procedure of Example 54 yields the desired product.

EXAMPLE 58

6[3-(phenylamino)-picolinamido]penicillanic acid

Substitution of 1.0 mmole of 3-phenylamino picolinic acid in the procedure of Example 55 yields the desired product.

EXAMPLE 59

7-[-6-butyl-3-(N-methyl-N-phenylamino)picolinamido] desacetoxy cephalosporanic acid Substitution of 1.8 mmole of sodium 6-(6-butyl-3-methylphenylamino picolinamido)penicillanate in the procedure of Example 54 yields the desired product.

EXAMPLE 60

7-[3-benzylaminopicolinamido]desacetoxy cephalosporanic acid

Substitution of 1.0 mmole of 3-benzylamino picolinic acid in the procedure of Example 54 yields the desired product.

EXAMPLE 61

7-[3-(N-o-nitrophenylsulfenyl-N-benzylamino)picolinamido]desacetoxy cephalosporanic acid Substitution of 1.0 mmole of 3-(o-nitrophenylsulfenyl benzylamino)picolinic acid in the procedure of Example 54 yields the desired product.

EXAMPLE 62

7-[3-(N-benzylamino)picolinamido]desacetoxy cephalosporanic acid

Substitution of 1.0 mmole of the product of the preceding example in the procedure of Example 44 yields the desired product.

EXAMPLE 63

7-[3-(acetylamino)-picolinamido]desacetoxy cephalosporanic acid

Substitution of 1.0 mmole of 3-acetylamino picolinic acid in the procedure of Example 54, followed by acidification of the reaction mixture precipitates the desired product.

EXAMPLE 64

7-[3-(N-benzoylamino)-picolinamido]desacetoxy cephalosporanic acid

Substitution of 1.0 mmole of 3-(N-benzoylamino) picolinic acid in the procedure of the preceding example gives the desired product.

EXAMPLE 65

3-(4'-phenyl)aminopicolinic acid

Substitution of p-chloraniline for aniline in the procedure of Example 52 gives the desired product.

What is claimed is:
1. A compound of the formula

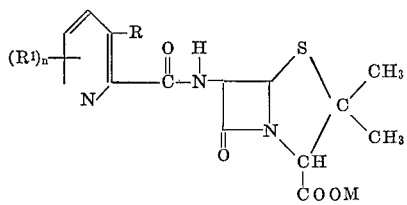

wherein

R is a halogen, $XR^2$ wherein X is O or S,

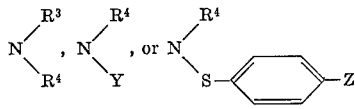

$R^2$ is H, an acyl group derived from hydrocarbon carboxylic acids of up to 12 carbon atoms, a lower alkylphenyl group, a phenyl lower alkyl group, or a phenyl group, $R^3$ and $R^4$ are the same or different and are selected from the group consisting of hydrogen, lower alkyl, cycloalkyl having from 4 to 7 carbon atoms, phenyl, phenyl lower alkyl, or lower alkylphenyl, one of $R^3$ and $R^4$ being other than phenyl, phenyl lower alkyl or lower alkylphenyl, Y is an acyl group derived from a hydrocarbon carboxylic acid of up to 12 carbon atoms or a sulfonyl group derived from an alkyl or a mono- or dicarbocyclic aryl sulfonic acid of up to 12 carbon atoms, Z is hydrogen or a nitro group, $R^1$ is hydrogen, lower alkyl, cycloalkyl having from 4 to 7 carbon atoms, lower alkoxy, phenyl, lower alkylphenyl, lower alkoxyphenyl or halophenyl, n is an integer from 1 to 3, and M is H or a pharmaceutically acceptable non-toxic cation.

2. A compound according to claim 1 wherein R is $XR^2$, X being O and $R^2$ being benzyl.

3. A compound according to claim 2 having the name sodium 6-(3-benzyloxy-2-picolinamido)penicillanate.

4. A compound according to claim 1 wherein R is

$R^3$ and $R^4$ being H.

5. A compound according to claim 4 having the name sodium 6-(3-aminopicolinamido)penicillanate.

6. A compound according to claim 1 wherein R is

$R^3$ being H and $R^4$ being methyl phenyl.

7. A compound according to claim 6 having the name sodium 6-(6-butyl-3-methylphenylaminopicolinamido)penicillanate.

8. A compound of the formula

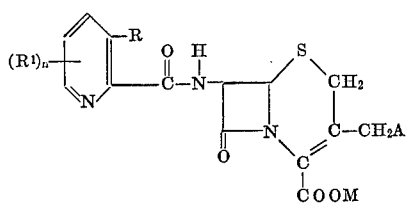

wherein

R is a halogen, $XR^2$ wherein X is O or S,

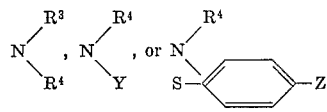

$R^2$ is H, an acyl group derived from hydrocarbon carboxylic acids of up to 12 carbon atoms, a lower alkylphenyl group, a phenyl lower alkyl group, or a phenyl group, $R^3$ and $R^4$ are the same or different and are selected from the group consisting of hydrogen, lower alkyl, cycloalkyl having from 4 to 7 carbon atoms, phenyl, phenyl lower alkyl, or lower alkylphenyl, one of $R^3$ and $R^4$ being other than phenyl, phenyl lower alkyl or lower alkylphenyl, Y is an acyl group derived from a hydrocarbon carboxylic acid of up to 12 carbon atoms or a sulfonyl group derived from an alkyl or a mono- or dicarbocyclic aryl sulfonic acid of up to 12 carbon atoms, Z is hydrogen or a nitro group, $R^1$ is hydrogen, lower alkyl, cycloalkyl having from 4 to 7 carbon atoms, lower alkoxy, phenyl, lower alkylphenyl, lower alkoxyphenyl or halophenyl, n is an integer from 1 to 3, M is H or a pharmaceutically acceptable non-toxic cation, and A is H or an acyloxy radical derived from a hydrocarbon carboxylic acid of up to 12 carbon atoms, a quaternary ammonium radical selected from the group consisting of tetramethylammonium, pyridinium, quinolium, and picolinium, amino, lower alkylamino, di(lower alkyl)amino, phenyl lower alkylamino, di(phenyl lower alkyl)amino, heterocyclic tertiary amino selected from the group consisting of imidazolyl and piperidino, lower alkyl mercapto, phenyl mercapto, phenyl lower alkylmercapto, thiouronium, lower alkyl substituted thiouronium, phenyl-subsituted thiouronium, phenyl lower alkyl substituted thiouronium, a monovalent carbon-oxygen bond when taken together with M, or an anionic charge when A is a quaternary ammonium radical.

9. A compound according to claim 8 wherein R is $XR^2$, X being O and $R^2$ being benzyl.

10. A compound according to claim 9 having the name sodium 7-(3-benzyloxy-2-picolinamido)cephalosporanate.

11. A compound according to claim 8 wherein R is

$R^3$ and $R^4$ being H.

12. A compound according to claim 11 having the name sodium 7-(3-aminopicolinamido)cephalosporanate.

13. A compound according to claim 8 wherein R is

$R^3$ being H and $R^4$ being methyl phenyl.

14. A compound according to claim 13 having the name sodium 7-(6-butyl-3-methylphenylaminopicolinamido)cephalosporanate.

References Cited

UNITED STATES PATENTS

| | | | |
|---|---|---|---|
| 3,202,653 | 8/1965 | Cheney et al. | 260—239.1 |
| 3,275,626 | 9/1966 | Morin et al. | 260—239.1 |
| 3,354,145 | 11/1967 | Baumann et al. | 260—239.1 |
| 3,373,155 | 3/1968 | Ekström et al. | 260—239.1 |

FOREIGN PATENTS 889,066  2/1962  Great Britain.

NICHOLAS S. RIZZO, Primary Examiner

U.S. Cl. X.R.

260—243; 424—246, 271

PO-1050
(5/69)

UNITED STATES PATENT OFFICE
CERTIFICATE OF CORRECTION

Patent No. 3,553,203          Dated  January 5, 1971

Inventor(s)  J. S. Paul Schwarz and John T. Sheehan

It is certified that error appears in the above-identified patent and that said Letters Patent are hereby corrected as shown below:

Column 1, formula (I), that portion of the formula reading

            should read           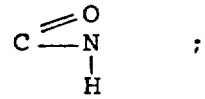 ;

and on line 65, "alkonoic" should read - - alkanoic - -.
Column 3, line 8, "rates," should read - - rats, - -. Column 4, line 41, "(Compounds)" should read - - (Compounds X) - -.
Column 7, line 68, "XXVII" should read - - XXVIII- -;  Column 8, line 47, "Formula" should read - - Formulae - -; and on line 55, after "and" should be inserted - - then - -. Column 9, line 42, "prmiary" should read - - primary - -; and that portion of formula (XXXVII) reading

            should read           

Column 11, line 17, "Formula" should read - - Formulae - -.
Column 17, line 26, "(butyl-" should read - - (6-butyl- - -.
Column 18, line 18, "benzzyl" should read - - benzyl - -.
Column 19, line 60, "water-tetra-" should read - - water:tetra- - -. Column 20, line 22, "6[3-" should read - - 6-[)-- - -; and on line 31, "1.8" should read - - 1.0 - -. Column 21, in the first formula, that portion reading

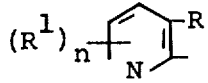            should read           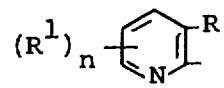

and on line 75, "is a halogen" should read - - is halogen - -.
Column 22, in the first formula, that portion reading

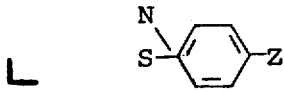            should read           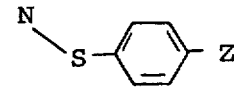

Signed and sealed this 8th day of June 1971.

(SEAL)
Attest:

EDWARD M. FLETCHER, JR.                    WILLIAM E. SCHUYLER, JR.
Attesting Officer                          Commissioner of Patents